United States Patent
Valenzuela (10) Patent No.: US 8,717,741 B2
(45) Date of Patent: May 6, 2014

(54) BUSBAR CONNECTION SYSTEM, SWITCHGEAR UNIT, AND METHOD OF TRANSPORTING SWITCHGEAR COMPONENTS

(75) Inventor: Ruben Valenzuela, Nuevo Leon (MX)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 13/451,289

(22) Filed: Apr. 19, 2012

(65) Prior Publication Data

US 2013/0279082 A1 Oct. 24, 2013

(51) Int. Cl.
*H02B 1/20* (2006.01)
*H01R 43/00* (2006.01)
*H01R 4/60* (2006.01)
*H01R 3/00* (2006.01)

(52) U.S. Cl.
CPC ... *H01R 4/60* (2013.01); *H02B 1/20* (2013.01)
USPC ........... 361/611; 361/605; 361/614; 361/624; 361/637; 174/72 B; 174/84 R; 174/88 B; 174/99 B; 174/149 B; 439/212; 439/213

(58) Field of Classification Search
CPC .......... H01R 43/00; H01R 3/00; H01R 13/64; H01R 2004/00; H01R 2101/00; H02B 1/20; H02B 5/00; G01F 1/16; H02K 3/522; H02K 5/225
USPC ................. 361/600, 601, 605, 611, 614, 615, 361/621–624, 627–632, 637–650, 658; 174/68.2, 68.3, 7 B, 71 B, 72 B, 84 B, 174/88 B, 99 B, 129 B, 133 B, 149 B; 264/263, 267, 271.1, 273, 274, 275; 200/48 R, 50 A, 50 AA, 50.01, 50.02, 200/168 K; 439/212, 213
See application file for complete search history.

(56) References Cited

U.S. PATENT DOCUMENTS

| | | | | |
|---|---|---|---|---|
| 3,349,291 A | * | 10/1967 | Olashaw | 361/624 |
| 3,553,534 A | * | 1/1971 | Bould et al. | 361/614 |
| 3,793,564 A | * | 2/1974 | Salvati et al. | 361/614 |
| 4,213,003 A | * | 7/1980 | Carlson | 174/88 B |
| 4,366,528 A | * | 12/1982 | Cole | 361/831 |
| 5,208,894 A | | 5/1993 | Johnson et al. | |
| 5,364,203 A | * | 11/1994 | Ishikawa | 403/403 |
| 5,783,779 A | * | 7/1998 | Graham et al. | 174/88 B |
| 5,941,654 A | * | 8/1999 | Chauquet | 403/384 |
| 6,040,976 A | * | 3/2000 | Bruner et al. | 361/611 |
| 6,069,321 A | * | 5/2000 | Wagener et al. | 174/99 B |
| 6,141,206 A | * | 10/2000 | Bruner et al. | 361/605 |
| 6,353,697 B1 | | 3/2002 | Daoud | |

(Continued)

*Primary Examiner* — Michail V Datskovskiy (74) *Attorney, Agent, or Firm* — General Electric Company (57) ABSTRACT

A busbar connection system for coupling a first busbar segment to a second busbar segment includes a mounting component defining a slot and configured to be coupled to the first busbar segment, a retaining component configured to be coupled to the second busbar segment, and a connecting member including a first end and an opposing second end. The first end is configured to be coupled to the mounting component and the second end is configured to be coupled to the retaining component. The busbar connection system also includes a pivot member configured to be operatively coupled to the first end and shaped to be received within the slot. The pivot member enables the connecting member to pivot about the mounting component.

20 Claims, 8 Drawing Sheets

(56) References Cited

U.S. PATENT DOCUMENTS

| | | | |
|---|---|---|---|
| 6,489,567 B2 * | 12/2002 | Zachrai | 174/149 B |
| 6,506,068 B2 * | 1/2003 | Wagener | 439/213 |
| 6,631,237 B2 | 10/2003 | Knudsen et al. | |
| 6,664,478 B2 * | 12/2003 | Mohan et al. | 174/149 B |
| 6,934,147 B2 * | 8/2005 | Miller et al. | 361/611 |
| 7,334,315 B2 | 2/2008 | Wiant et al. | |
| 7,449,635 B2 * | 11/2008 | Wiant | 174/68.2 |
| 7,558,053 B2 * | 7/2009 | Moore et al. | 361/611 |
| 7,718,895 B2 * | 5/2010 | Rodriguez | 174/84 R |
| 8,134,070 B2 * | 3/2012 | Hirschfeld | 174/72 B |
| 8,379,374 B2 * | 2/2013 | Keegan | 361/637 |
| 8,512,057 B2 * | 8/2013 | Haar et al. | 439/212 |
| 8,540,526 B2 * | 9/2013 | Mooney et al. | 439/213 |

\* cited by examiner

BUSBAR CONNECTION SYSTEM, SWITCHGEAR UNIT, AND METHOD OF TRANSPORTING SWITCHGEAR COMPONENTS

BACKGROUND OF THE INVENTION

The present application relates generally to power systems and, more particularly, to a busbar connection system, a switchgear unit, and a method of transporting switchgear components.

At least some known circuit breakers are included within electronic or magnetic trip devices that programmably interrupt a current provided to a load. The trip devices and the circuit breakers may be installed in switchgear or other power distribution systems that provide electricity to important revenue-generating machinery and/or to machines or devices that are highly desirable to maintain in operation.

Some known switchgear are installed at a customer site to protect the machines or devices therein. The switchgear typically include one or more busbars that enable current to flow to a load. At least some known busbars are transported to the installation site in a plurality of busbar segments. The busbar segments are connected together, for example, by a technician at the installation site. However, some parts transported with the busbar segments may become misplaced or lost if those parts are shipped independently of other parts. Accordingly, an installation of at least some known busbars and/or switchgear may be hindered and/or may be difficult and/or expensive.

BRIEF DESCRIPTION OF THE INVENTION

In one aspect, a busbar connection system for coupling a first busbar segment to a second busbar segment is provided that includes a mounting component defining a slot and configured to be coupled to the first busbar segment, a retaining component configured to be coupled to the second busbar segment, and a connecting member including a first end and an opposing second end. The first end is configured to be coupled to the mounting component and the second end is configured to be coupled to the retaining component. The busbar connection system also includes a pivot member configured to be operatively coupled to the first end and shaped to be received within the slot. The pivot member enables the connecting member to pivot about the mounting component.

In another aspect, a switchgear unit is provided that includes a first busbar segment, a second busbar segment, a trip mechanism coupled to at least one of the first busbar segment and the second busbar segment, and a busbar connection system. The busbar connection system includes a mounting component defining a slot, a retaining component, and a connecting member including a first end and a second end. The mounting component is configured to be coupled to the first busbar segment, and the retaining component is configured to be coupled to the second busbar segment. The first end of the connecting member is configured to be coupled to the mounting component and the second end is configured to be coupled to the retaining component. The busbar connection system also includes a pivot member configured to be operatively coupled to the first end and shaped to be received within the slot. The pivot member enables the connecting member to pivot about the mounting component.

In yet another aspect, a method of transporting switchgear is provided that includes coupling a mounting component to a first busbar segment, wherein a slot is defined within the mounting component, and pivotally coupling a connecting member to the mounting component by inserting a pivot member through the slot. The pivot member is one of coupled to the connecting member and formed within the connecting member. The method also includes coupling a retaining component to a second busbar segment, wherein the retaining component is configured to be coupled to the connecting member, and transporting the first busbar segment and the second busbar segment to a predetermined location.

DETAILED DESCRIPTION OF THE INVENTION

Exemplary embodiments of a busbar connection system, a switchgear unit, and a method of transporting switchgear are described herein. The busbar connection system includes a plurality of busbar segments that are coupled together to form one or more busbars arranged in one or more busbar phases. In one embodiment, a first phase of busbar segments (a "first busbar phase") includes a first busbar segment, a second busbar segment, a third busbar segment, and a fourth busbar segment. A mounting component is coupled to the first busbar segment and to the second busbar segment. A retaining component is coupled to the third busbar segment and to the fourth busbar segment. A connecting member is pivotally coupled to the first busbar segment and the second busbar segment by the mounting component.

In an embodiment, the partially assembled busbar connection system is transported to a predetermined location, such as an installation site, to complete the assembly. At the installation site, the connecting member is pivoted into contact with the retaining component and is coupled to the retaining component and to the third and fourth busbar segments. Other components of the switchgear, including a circuit protection device and a trip mechanism, are coupled to the busbars to complete the assembly.

Figure 1:
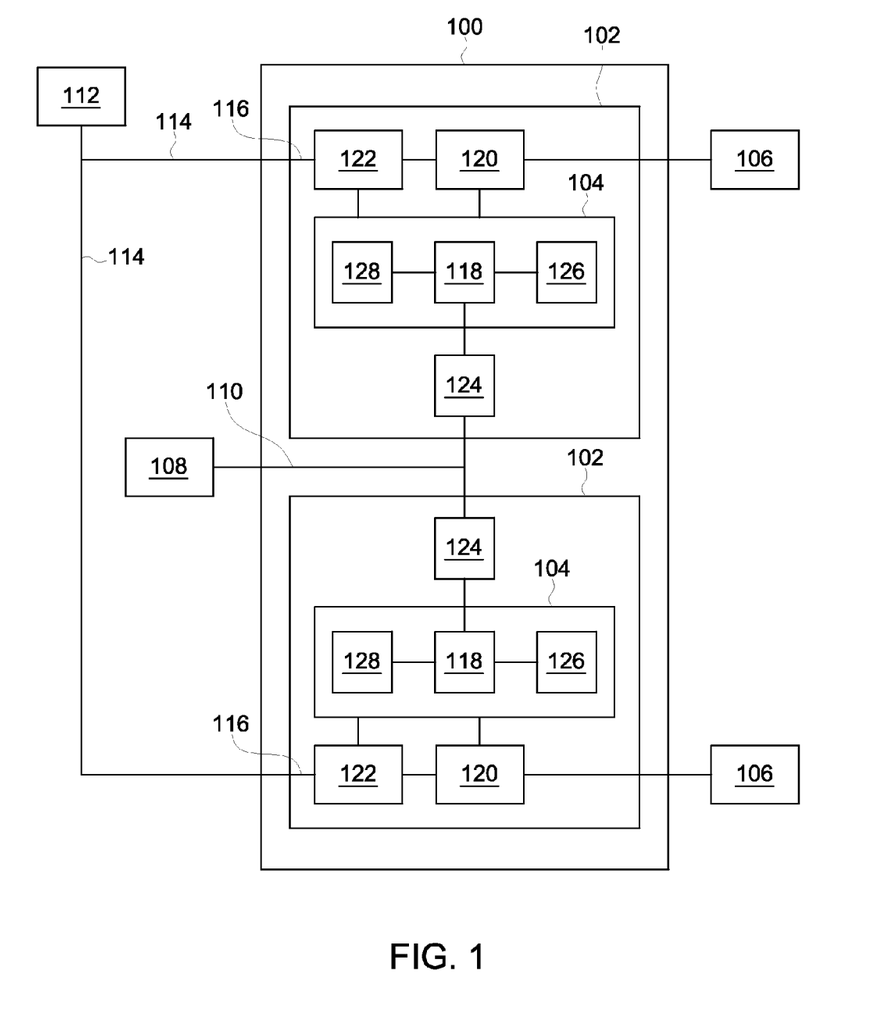
FIG. 1 is a block diagram of an exemplary power distribution system.

FIG. 1 is a block diagram of power distribution system 100 including a plurality of electrical distribution enclosures that may include, without limitation, panel boards, switchboards, and/or switchgear (hereinafter referred to as switchgear units 102). Power distribution system 100 also includes a plurality of circuit protection devices 104 within switchgear units 102. Each circuit protection device 104 is removably coupled within switchgear unit 102 and is configured to programmably control power to one or more loads 106.

Power distribution system 100 includes a central controller 108 that controls and/or monitors operation of switchgear units 102 and/or circuit protection devices 104 within switchgear units 102. Central controller 108 communicates with switchgear units 102 through a network 110, and includes a processor and a memory (neither shown) for controlling and/or monitoring switchgear units 102 and/or circuit protection devices 104.

Loads 106 may include, but are not limited to only including, machinery, motors, lighting, and/or other electrical and mechanical equipment of a manufacturing or power generation or distribution facility. Power is provided to switchgear unit 102 from an electrical power source 112 through an electrical distribution line 114, which is coupled to one or more busbars 116 within switchgear unit 102. Busbars 116 are also coupled to circuit protection device 104 such that circuit protection device 104 may selectably enable or disable current from flowing through busbars 116 and electrical distribution line 114 to one or more loads 106. Busbars 116 are manufactured from an electrically conductive material, such as copper or any other material, to enable current to flow through busbars 116 from electrical power source 112 to one or more loads 106.

In an exemplary embodiment, each circuit protection device 104 includes a processor 118 for controlling circuit protection device 104. In addition, each circuit protection device 104 is coupled to at least one sensor 120 and at least one trip mechanism 122, such as one or more circuit breaker devices or arc containment devices. Trip mechanism 122 is coupled to one or more busbars 116, and/or one or more segments of busbars 116, to controllably enable current to flow, or disable current from flowing, to one or more loads 106. Exemplary circuit breaker devices include, for example, circuit switches, contact arms, and/or circuit interrupters that interrupt current flow through the circuit breaker device to a load coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

In an exemplary embodiment, sensor 120 is a current sensor, such as a current transformer, a Rogowski coil, a Hall-effect sensor, and/or a shunt that measures a current flowing through trip mechanism 122. Alternatively, sensor 120 may include any other sensor that enables power distribution system 100 to function as described herein. In an exemplary embodiment, each sensor 120 generates a signal representative of the measured or detected current (hereinafter referred to as "current signal") flowing through an associated trip mechanism 122. In addition, each sensor 120 transmits the current signal to processor 118 associated with, or coupled to, trip mechanism 122. Each processor 118 is programmed to activate trip mechanism 122 to interrupt a current provided to a load 106 if the current signal, and/or the current represented by the current signal, exceeds a programmable current threshold.

In an exemplary embodiment, processors 118 are also communicatively coupled to central controller 108. For example, processors 118 may be directly coupled for communication with central controller 108, or may be coupled for communication with central controller 108 through a communication unit 124. Communication between processors 118 and central controller 108 may also be provided through a hardwired communication link or through a wireless communication link. Processors 118 collect measured operating condition data relating to a corresponding trip mechanism 122. For example, each processor 118 gathers measured operating condition data, such as data representative of the current signal (also referred to herein as "current data"), from a sensor 120 associated with a trip mechanism 122 coupled to processor 118. Processor 118 stores the current data in a memory 126 coupled to processor 118, and/or transmits the current data to central controller 108.

Processor 118 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory 126 stores program code and instructions, executable by processor 118, to control and/or monitor circuit protection device 104 and/or trip mechanism 122. In an exemplary embodiment, memory 126 includes non-volatile RAM to enable data stored in memory 126 to be retained after a power loss. Alternatively or additionally, memory 126 may include magnetic RAM (MRAM), ferroelectric RAM (Fe-RAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 126. Memory 126 may also be, or include, a detachable or removable memory, including, but not limited to, a suitable cartridge, disk, CD ROM, DVD or USB memory.

In one embodiment, circuit protection device 104 also includes a display device 128 coupled to processor 118. In a specific embodiment, display device 128 includes one or more light-emitting diodes (LEDs) that indicate a status of circuit protection device 104 and/or trip mechanism 122. For example, processor 118 may activate one or more components (e.g., LEDs) of display device 128 to indicate that circuit protection device 104 and/or trip mechanism 122 is active and/or operating normally, that a fault or failure has occurred, and/or any other status of trip mechanism 122 and/or circuit protection device 104.

Figure 2:
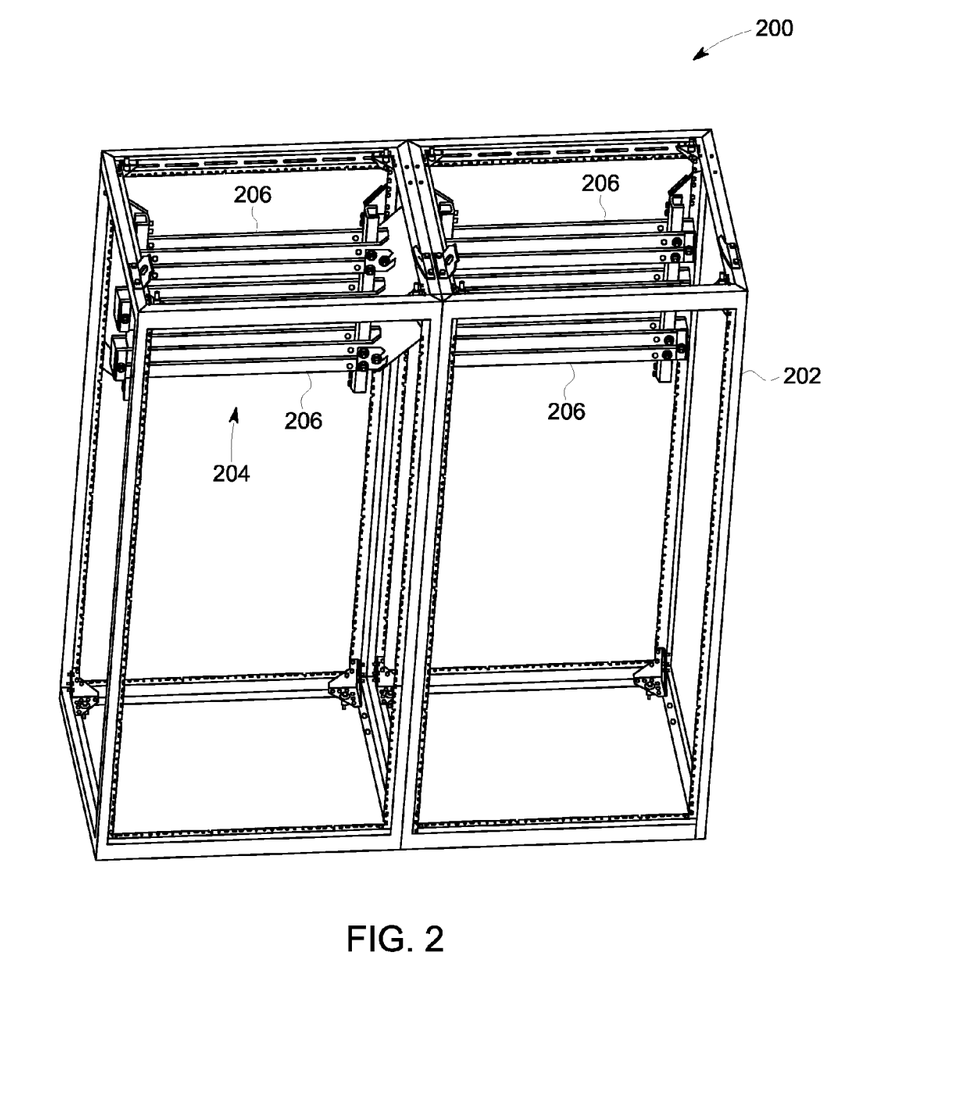
FIG. 2 is an isometric view of an exemplary switchgear housing that may be used to house the switchgear unit shown in FIG. 1.

FIG. 2 is an isometric view of an exemplary switchgear housing 200 (sometimes referred to as a cabinet) that may be used to house, or enclose, switchgear unit 102 (shown in FIG. 1).

In an exemplary embodiment, housing 200 includes a support framework 202 for protecting and/or supporting components of switchgear unit 102. Housing and/or support framework 202 is manufactured from a metal and/or a metal alloy, such as steel. Alternatively, housing 200 and/or support framework 202 may be manufactured from any other material that enables housing 200 to function as described herein.

A busbar connection system 204 is enclosed within housing 200 and is configured to be coupled to support framework 202. Busbar connection system 204 includes a plurality of busbar segments 206 that are coupled together to form one or more busbars 116 (shown in FIG. 1) and other components of switchgear unit 102 are coupled to busbars 116. Busbar connection system 204 is manufactured from one or more conductive materials, such as copper, to enable current to flow through busbar 116 when assembled.

Figure 3:
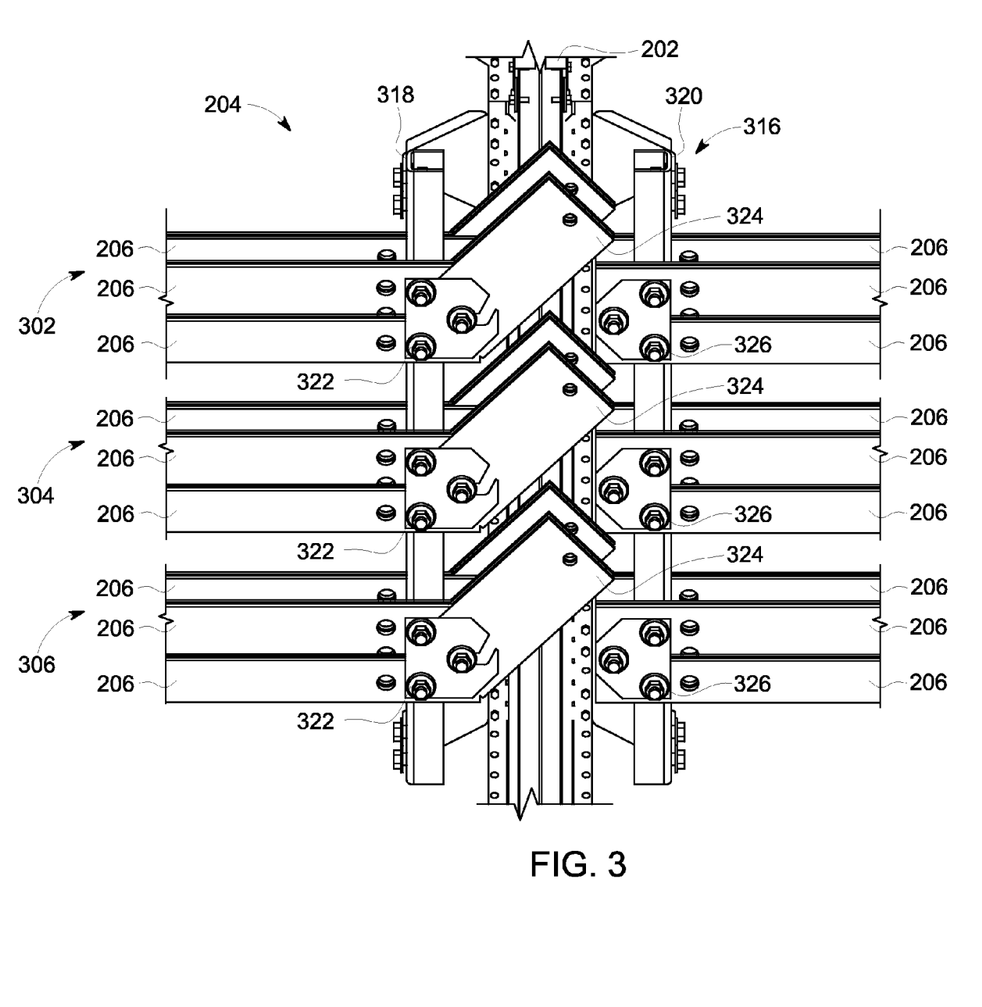
FIG. 3 is an isometric view of the busbar connection system shown in FIG. 2.
Figure 4:
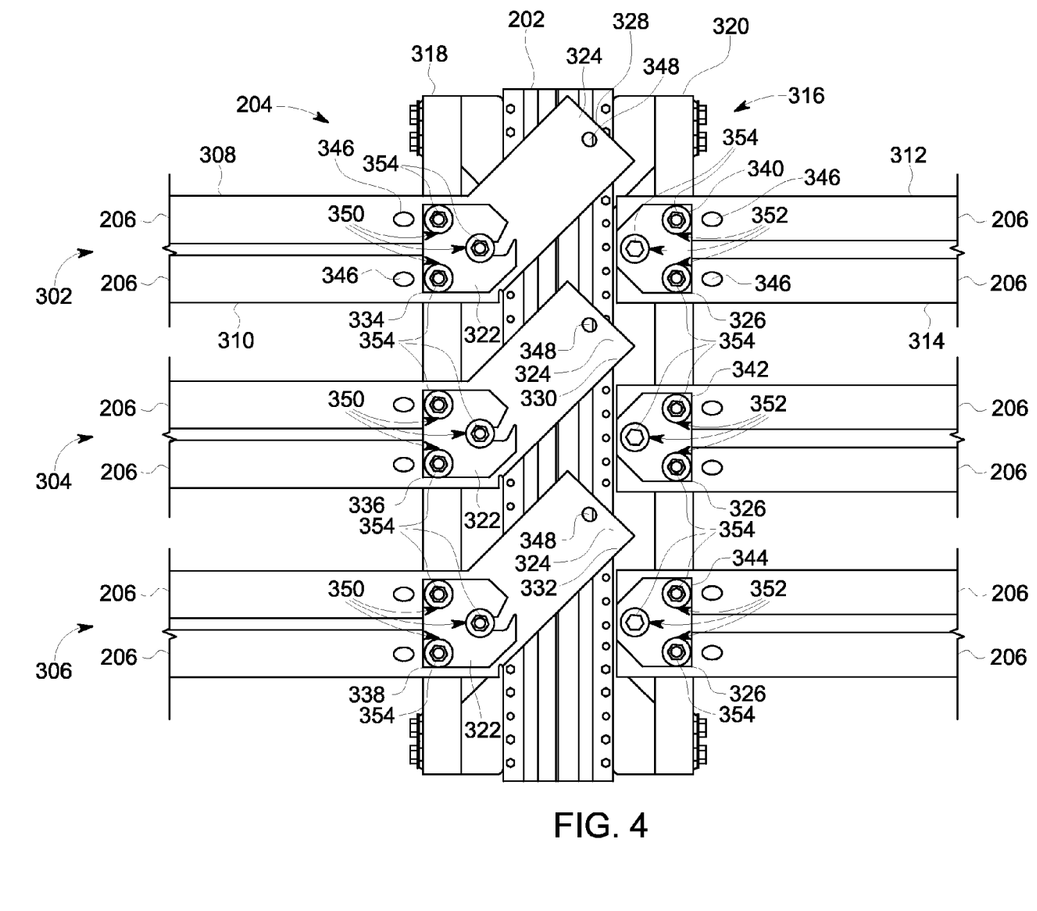
FIG. 4 is a front view of the busbar connection system shown in FIG. 2.
Figure 5:
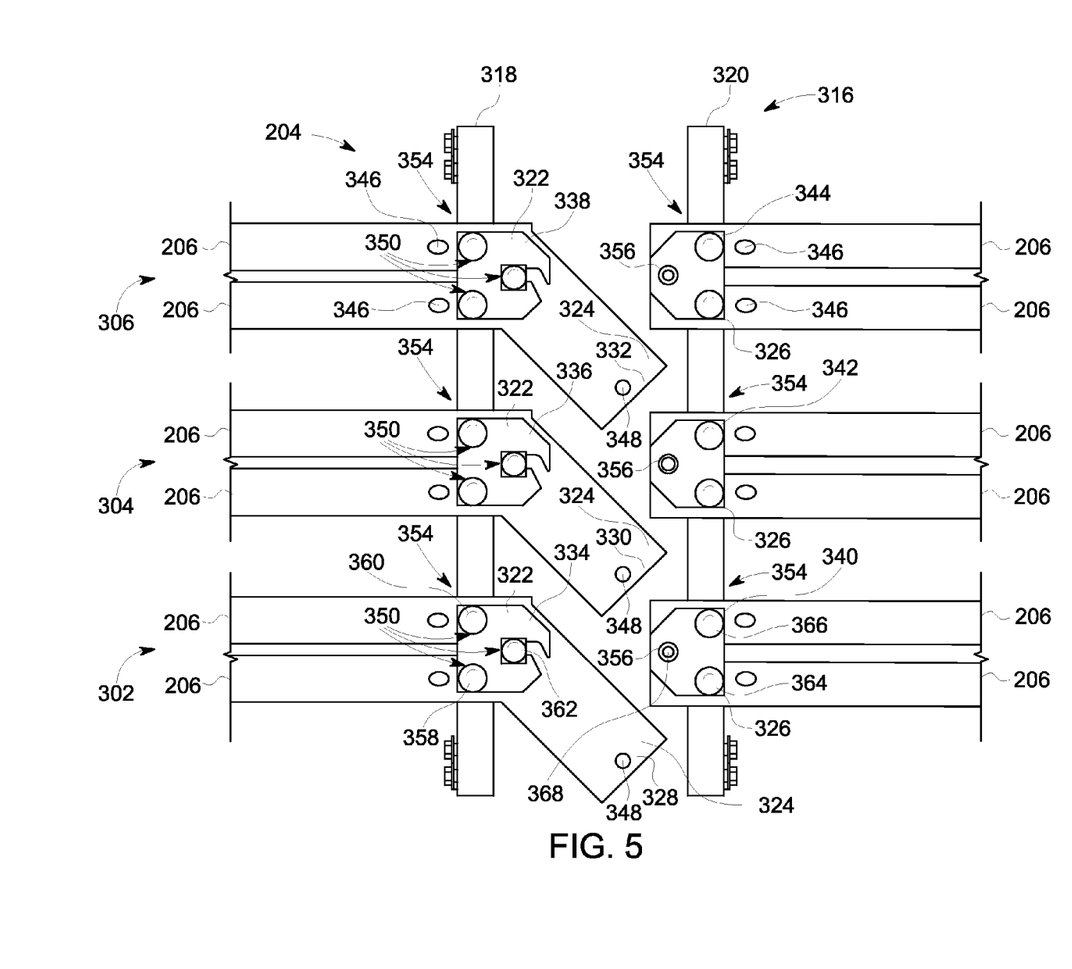
FIG. 5 is a rear view of the busbar connection system shown in FIG. 2.

FIG. 3 is an isometric view of busbar connection system 204. FIG. 4 is a front view of busbar connection system 204. FIG. 5 is a rear view of busbar connection system 204.

Busbar segments 206 are arranged in a first busbar phase 302, a second busbar phase 304, and a third busbar phase 306 for receiving a first phase, a second phase, and a third phase of current. Alternatively, busbar segments 206 may be arranged in any number of phases that enables busbar connection system 204 to function as described herein. In an exemplary embodiment, first busbar phase 302 transmits a first phase of current, second busbar phase 304 transmits a second phase of current, and third busbar phase 306 transmits a third phase of current through switchgear housing 200 and through switchgear unit 102 to load 106 (shown in FIG. 1), for example.

In addition, each busbar phase may include a single busbar segment 206 or may include a plurality of busbar segments 206. The number of busbar segments 206 is selected based on an amount of current capacity desired for the busbar phase.

For example, referring to FIG. 4, first busbar phase 302 may include a first busbar segment 308, a second busbar segment 310, a third busbar segment 312 and a fourth busbar segment 314. First busbar segment 308 and second busbar segment 310 are sometimes referred to as input segments of first busbar phase 302, and third busbar segment 312 and fourth busbar segment 314 are sometimes referred to as output segments of first busbar phase 302. First busbar segment 308 is coupled to third busbar segment 312, and second busbar segment 310 is coupled to fourth busbar segment 314 to form first busbar phase 302 and to enable current to be transmitted through first busbar phase 302 when first busbar phase 302 is electrically coupled to an electrical power source. Second busbar phase 304 and third busbar phase 306 may include busbar segments 206 similar to busbar segments 206 described with respect to first busbar phase 302. It should be recognized that first busbar segment 308 and second busbar segment 310 may alternatively be configured as output segments, and third busbar segment 312 and fourth busbar segment 314 may be configured as input segments. In such a configuration, third busbar segment 312 and fourth busbar segment 314 are coupled to the electrical power source and transmit current to first busbar segment 308 and second busbar segment 310. Alternatively, busbar segments 206 may be configured in any other configuration that enables busbar connection system 204 to function as described herein.

In an exemplary embodiment, support framework 202 includes a plurality of support bars 316, such as a first support bar 318 and a second support bar 320. Alternatively, support framework 202 includes any suitable number of support bars 316 that enables switchgear housing 200 to function as described herein. Busbar segments 206 are coupled to, and supported by, support bars 316 to secure segments 206 within housing 200.

Busbar connection system 204 includes a plurality of mounting components 322 that couple one or more connecting members 324 to one or more busbar segments 206. Connecting members 324 enable input busbar segments 206 within a busbar phase to be coupled together. Busbar connection system 204 also includes a plurality of retaining components 326 that facilitate coupling output busbar segments 206 of the busbar phase together. In an exemplary embodiment, each busbar phase includes at least one connecting member 324 coupled to busbar segments 206 of the busbar phase by at least one mounting component 322, and includes at least one retaining component 326 coupled to busbar segments 206 of the busbar phase by at least one connecting member 324.

In an exemplary embodiment, mounting components 322 and retaining components 326 are, or include, one or more brackets or plates. Alternatively, mounting components 322 and/or retaining components 326 are, or include, any other component that enables busbar connection system 204 to function as described herein. In addition, connecting members 324, mounting components 322, and retaining components 326 are manufactured from a conductive material, such as a metal or a metal alloy, to enable current to be conducted through busbar segments 206 when segments 206 are coupled together.

In an exemplary embodiment, connecting members 324 include a first connecting member 328, a second connecting member 330, and a third connecting member 332. Mounting components 322 include a first mounting component 334, a second mounting component 336, and a third mounting component 338. In addition, retaining components 326 include a first retaining component 340, a second retaining component 342, and a third retaining component 344. First connecting member 328, first mounting component 334, and first retaining component 340 couple busbar segments 206 of first busbar phase 302 together. Similarly, second connecting member 330, second mounting component 336, and second retaining component 342 couple busbar segments 206 of second busbar phase 304 together, and third connecting member 332, third mounting component 338, and third retaining component 344 couple busbar segments 206 of third busbar phase 306 together.

Each busbar segment 206 includes at least one opening 346 to enable a mounting component 322 and/or a retaining component 326 to be coupled to busbar segment 206. In addition, each connecting member 324 includes at least one opening 348, each mounting component 322 includes at least one opening 350, and each retaining component 326 includes at least one opening 352. Mounting component 322 and connecting member 324 are coupled to busbar segment 206 (through respective openings) using at least one coupling mechanism 354, and retaining component 326 and connecting member 324 are coupled to another busbar segment 206 (through respective openings) using at least one other coupling mechanism 354, as described more fully herein. In an exemplary embodiment, each coupling mechanism 354 is shaped and sized to be inserted through openings 346, 348, 350, and/or 352, and includes one or more bolts, screws, pins, clips, and/or any other coupling component or fastener that enables busbar connection system 204 to function as described herein.

In addition, as shown in FIG. 5, coupling mechanism 354 includes an internally threaded self-clinching fastener 356 coupled within an opening 352 of retaining component 326. For example, when connecting member 324 of first busbar segment 308 is positioned such that an opening 348 of connecting member 324 is aligned with opening 352 of retaining component 326, a carriage bolt, or another suitable coupling mechanism or component, is inserted through opening 348 of connecting member 324, through opening 352 of retaining component 326, and through fastener 356 to couple and/or retain connecting member 324 against third busbar segment 312.

In an embodiment, coupling mechanisms 354 include a first coupling mechanism 358, a second coupling mechanism 360, a third coupling mechanism 362, a fourth coupling mechanism 364, a fifth coupling mechanism 366, and a sixth coupling mechanism 368 for coupling components of first busbar phase 302 together, as described more fully herein. Second busbar phase 304 and third busbar phase 306 include similar coupling mechanisms 354 as first busbar phase 302. Alternatively, any suitable number of coupling mechanisms 354 may be included within busbar connection system 204.

During assembly, busbar segments 206 are coupled together to form one or more busbars 116, such as first busbar phase 302, second busbar phase 304, and/or third busbar phase 306. More specifically, a connecting member 324 is pivotally coupled to first busbar segment 308 and to second busbar segment 310 of first busbar phase 302 by a mounting component 322. A retaining component 326 is coupled to third busbar segment 312 and to fourth busbar segment 314. Connecting member 324 is rotated or pivoted about first busbar segment 308 and second busbar segment 310 such that connecting member 324 contacts retaining component 326. Connecting member 324 is secured to retaining component 326 by coupling mechanism 354. In a similar manner, busbar segments 206 of second busbar phase 304 and busbar segments 206 of third busbar phase 306 are coupled together. It should be recognized that, as described herein, connecting member 324 may be pivoted to couple to retaining component 326 without having to decouple connecting member 324 from first busbar segment 308 and/or without having to decouple connecting member 324 from mounting component 322. It should also be recognized that, while connecting members 324 and mounting components 322 are illustrated in FIGS. 3-5, for example, as being coupled to first busbar segment 308 and second busbar segment 310, connecting members 324 and mounting components 322 may alternatively be coupled to third busbar segment 312 and/or fourth busbar segment 314 and pivoted into contact with retaining components 326 coupled to first busbar segment 308 and/or second busbar segment 310.

Busbar segments 206 of first busbar phase 302, second busbar phase 304, and third busbar phase 306 are coupled to support bars 316 to retain busbar segments 206 within switchgear housing 200. In an exemplary embodiment, first busbar segment 308 and second busbar segment 310 are coupled to first support bar 318, and third busbar segment 312 and fourth busbar segment 314 are coupled to second support bar 320. In addition, busbar segments 206 of first busbar phase 302, second busbar phase 304, and/or third busbar phase 306 are coupled to switchgear units 102, to loads 106, and/or to any other suitable components of power distribution system 100 (shown in FIG. 1) to enable current to be transmitted through busbar segments 206 to loads 106.

Figure 6:
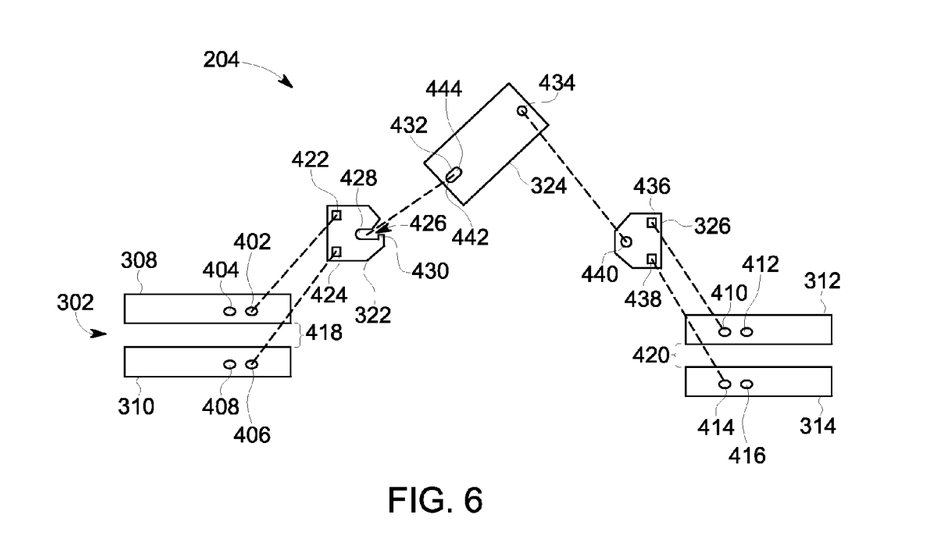
FIG. 6 is an exploded view of a portion of the busbar connection system shown in FIG. 2.

FIG. 6 is an exploded view of a portion of busbar connection system 204, such as first busbar phase 302. While FIG. 6 only illustrates first busbar phase 302, it should be recognized that other busbar phases, such as second busbar phase 304 and third busbar phase 306, are substantially similar to first busbar phase 302.

As illustrated in FIG. 6, first busbar segment 308 includes a first opening 402 and a second opening 404, second busbar segment 310 includes a first opening 406 and a second opening 408, third busbar segment 312 includes a first opening 410 and a second opening 412, and fourth busbar segment 314 includes a first opening 414 and a second opening 416. First busbar segment 308 is spaced apart from second busbar segment 310 such that a first gap 418 is defined between first busbar segment 308 and second busbar segment 310. Third busbar segment 312 is spaced apart from fourth busbar segment 314 such that a second gap 420 is defined between third busbar segment 312 and fourth busbar segment 314.

In addition, mounting component 322 includes a first opening 422, a second opening 424, and a third opening, or slot 426. Mounting component slot 426 is elongated and includes a first end 428 and a second end 430. Connecting member 324 includes a first opening, or slot, 432 and a second opening 434, and retaining component 326 includes a first opening 436, a second opening 438, and a third opening 440. Connecting member slot 432 is elongated and includes a first end 442 and a second end 444.

During assembly, mounting component first opening 422 is aligned with first busbar segment first opening 402, and mounting component second opening 424 is aligned with second busbar segment first opening 406. First coupling mechanism 358 (shown in FIG. 3) is inserted through mounting component first opening 422 and first busbar segment first opening 402, and second coupling mechanism 360 is inserted through mounting component second opening 424 and second busbar segment first opening 406 to couple mounting component 322 to first busbar segment 308 and second busbar segment 310. Mounting component 322 facilitates maintaining first busbar segment 308 spaced apart from second busbar segment 310 by first gap 418.

Connecting member slot 432 is aligned with mounting component slot 426 and third coupling mechanism 362 (also referred to herein as a "pivot member 362") is inserted through connecting member slot 432 and mounting component slot 426 to pivotally couple connecting member 324 to mounting component 322. More specifically, pivot member 362 is shaped to be received within slot 426, first gap 418, and connecting member slot 432. Pivot member 362 is inserted through mounting component slot 426 and through first gap 418 such that connecting member 324 is slidably and pivotally coupled to mounting component 322. In addition, connecting member 324 is slidably and pivotally coupled to first busbar segment 308 and to second busbar segment 310 by mounting component 322. In an alternative embodiment, pivot member 362 is integrally formed within connecting member 324 and is inserted through mounting component slot 426 to pivotally and/or slidably couple connecting member 324 to mounting component 322.

Retaining component first opening 436 is aligned with third busbar segment first opening 410, and retaining component second opening 438 is aligned with fourth busbar segment first opening 414. Fourth coupling mechanism 364 is inserted through retaining component first opening 436 and third busbar segment first opening 410, and fifth coupling mechanism 366 is inserted through retaining component second opening 438 and fourth busbar segment first opening 414 to couple retaining component 326 to third busbar segment 312 and fourth busbar segment 314. Retaining component 326 facilitates maintaining third busbar segment 312 spaced apart from fourth busbar segment 314 by second gap 420.

In addition, first busbar segment 308, second busbar segment 310, and mounting component 322 are coupled to first support bar 318 (shown in FIG. 3) using first coupling mechanism 358 and second coupling mechanism 360, or using any other suitable coupling mechanism. Third busbar segment 312, fourth busbar segment 314, and retaining component 326 are coupled to second support bar 320 (shown in FIG. 3) using fourth coupling mechanism 364 and fifth coupling mechanism 366, or using any other suitable coupling mechanism.

Connecting member 324 is rotated, or pivoted, about mounting component 322, first busbar segment 308, and second busbar segment 310 such that connecting member 324 contacts retaining component 326, and such that connecting member second opening 434 is aligned with retaining component third opening 440. Connecting member 324 may also be slidably adjusted within slot 426 and first gap 418 to move connecting member 324 towards, or away from, retaining component 326 to facilitate aligning connecting member second opening 434 with retaining component third opening 440. Sixth coupling mechanism 368 (e.g., a carriage bolt) is inserted through connecting member second opening 434, retaining component third opening 440, and fastener 356 to couple connecting member 324 to retaining component 326 and to third busbar segment 312 and fourth busbar segment 314.

It should be recognized that the components of busbar connection system 204 and/or switchgear unit 102 may be assembled at different times and/or locations as compared to other components of busbar connection system 204 to facilitate installation and/or assembly of switchgear housing 200. For example, first busbar segment 308, second busbar segment 310, mounting component 322, and connecting member 324 may be assembled together at a first assembly site and may be shipped to an installation site. Third busbar segment 312, fourth busbar segment 314, and retaining component 326 may be assembled together at a second site (or the first site) or may be shipped to the installation site for assembly. The assembly of busbar connection system 204 is then completed by rotating (or pivoting) connecting member 324 into contact with retaining component 326 and coupling connecting member 324 to retaining component 326 with a coupling mechanism 354 (e.g., sixth coupling mechanism 368).

Figure 7:
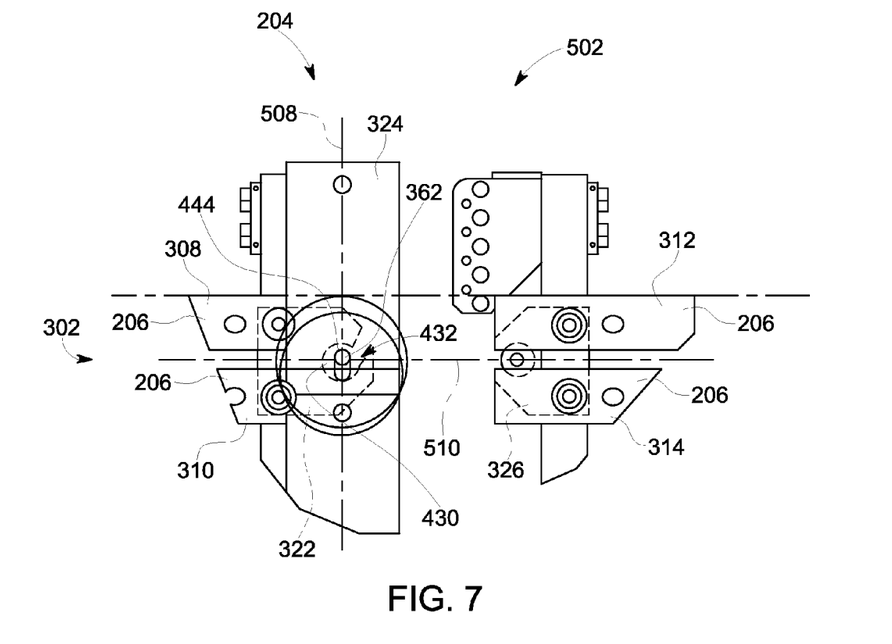
FIG. 7 illustrates an assembly sequence of the busbar connection system shown in FIG. 2 with the connecting member arranged in a first position.
Figure 8:
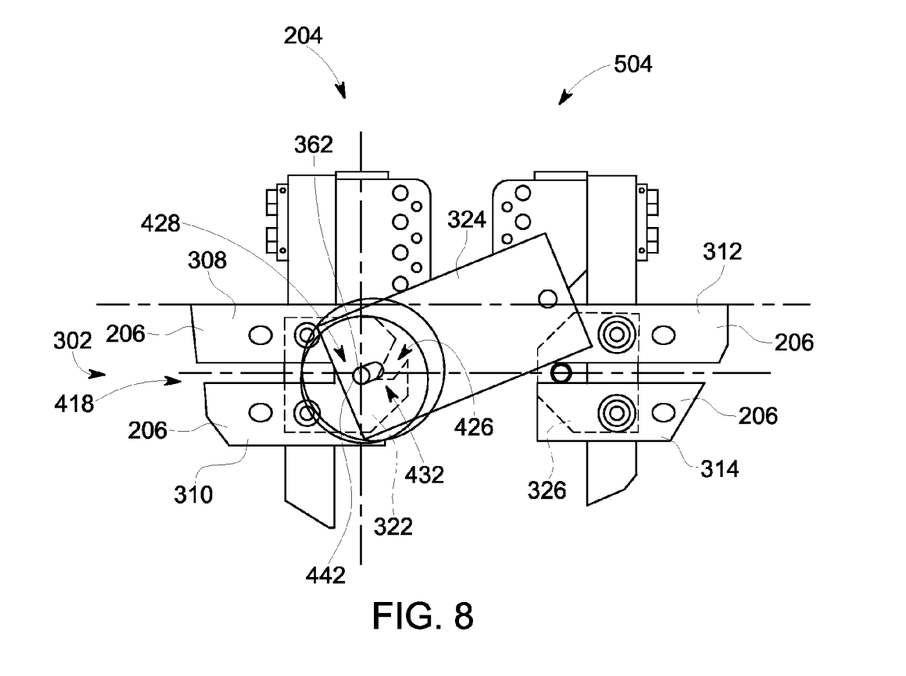
FIG. 8 illustrates an assembly sequence of the busbar connection system shown in FIG. 2 with the connecting member arranged in a second position.
Figure 9:
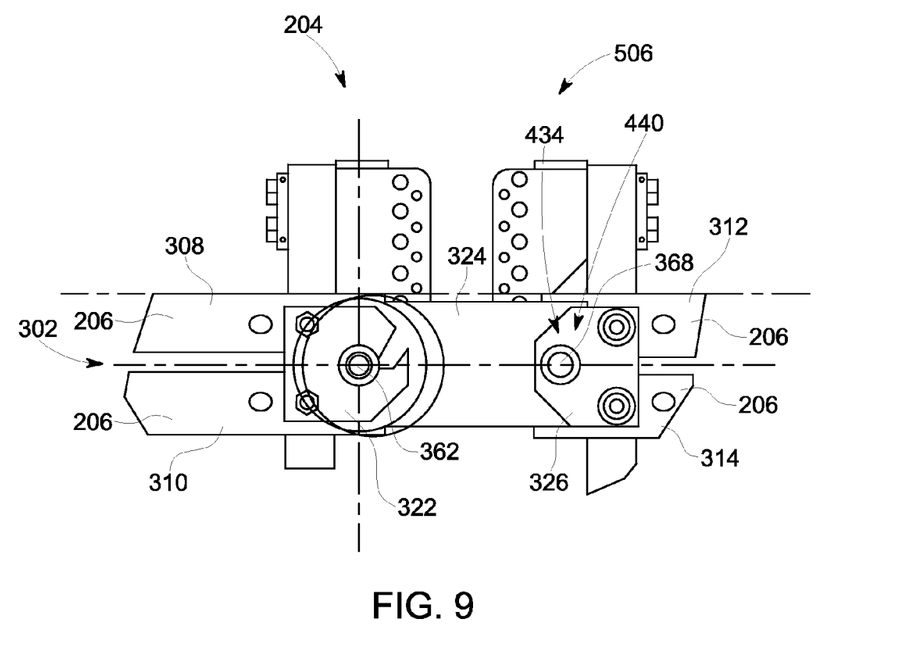
FIG. 9 illustrates an assembly sequence of the busbar connection system shown in FIG. 2 with the connecting member arranged in a third position.

FIGS. 7-9 illustrate an assembly sequence of a portion of busbar connection system 204, such as first busbar phase 302. More specifically, FIG. 7 illustrates busbar connection system 204 with connecting member 324 arranged in a first position 502, FIG. 8 illustrates busbar connection system 204 with connecting member 324 arranged in a second position 504, and FIG. 9 illustrates busbar connection system 204 with connecting member 324 arranged in a third position 506.

Referring to FIG. 7, in an exemplary embodiment, first busbar segment 308 and second busbar segment 310 are transported to an installation site with connecting member 324 arranged in a first position 502 to facilitate protecting first busbar segment 308, second busbar segment 310, and/or connecting member 324 during transportation. First position 502 is a position in which a centerline axis 508 of connecting member 324 is substantially perpendicular to a centerline axis 510 of first busbar phase 302. Alternatively, first position 502 may be any other position in which connecting member 324 is coupled to first busbar segment 308 and/or second busbar segment 310. In addition, when connecting member 324 is in first position 502, second end 444 of connecting member slot 432 is positioned against pivot member 362, and pivot member 362 is positioned proximate to second end 430 of mounting component slot 426.

Referring to FIG. 8, connecting member 324 is illustrated in a second position 504 in which connecting member 324 is shown after having been pivoted towards third busbar segment 312 and fourth busbar segment 314 during installation and/or assembly of switchgear housing 200 and/or busbar connection system 204, for example.

Connecting member 324 is extended towards third busbar segment 312 and fourth busbar segment 314 to second position 504 such that pivot member 362 moves within mounting component slot 426, first gap 418, and connecting member slot 432. When connecting member 324 is in second position 504, first end 442 of connecting member slot 432 is positioned against pivot member 362, and pivot member 362 is positioned against first end 428 of mounting component slot 426.

Referring to FIG. 9, connecting member 324 is shown after having been pivoted into a third position 506 that enables connecting member 324 to contact third busbar segment 312, fourth busbar segment 314, and retaining component 326. In addition, connecting member second opening 434 is aligned with retaining component third opening 440. Sixth coupling mechanism 368 is inserted through connecting member second opening 434 and through retaining component third opening 440 to couple connecting member 324 to third busbar segment 312, fourth busbar segment 314, and retaining component 326, and to retain connecting member 324 in third position 506. In the embodiment illustrated in FIG. 9, retaining component 326 is positioned over connecting member 324 and is coupled thereto such that retaining component 326 maintains connecting member 324 in position against third busbar segment 312 and/or fourth busbar segment 314. However, it should be recognized that retaining component 326 may be positioned between connecting member 324 and third busbar segment 312 and/or fourth busbar segment 314, and may be coupled thereto to maintain connecting member 324 in position against third busbar segment 312 and/or fourth busbar segment 314. Busbar segments 206 of other busbar phases, such as second busbar phase 304 and third busbar phase 306, are assembled in a similar manner as described herein.

Figure 10:
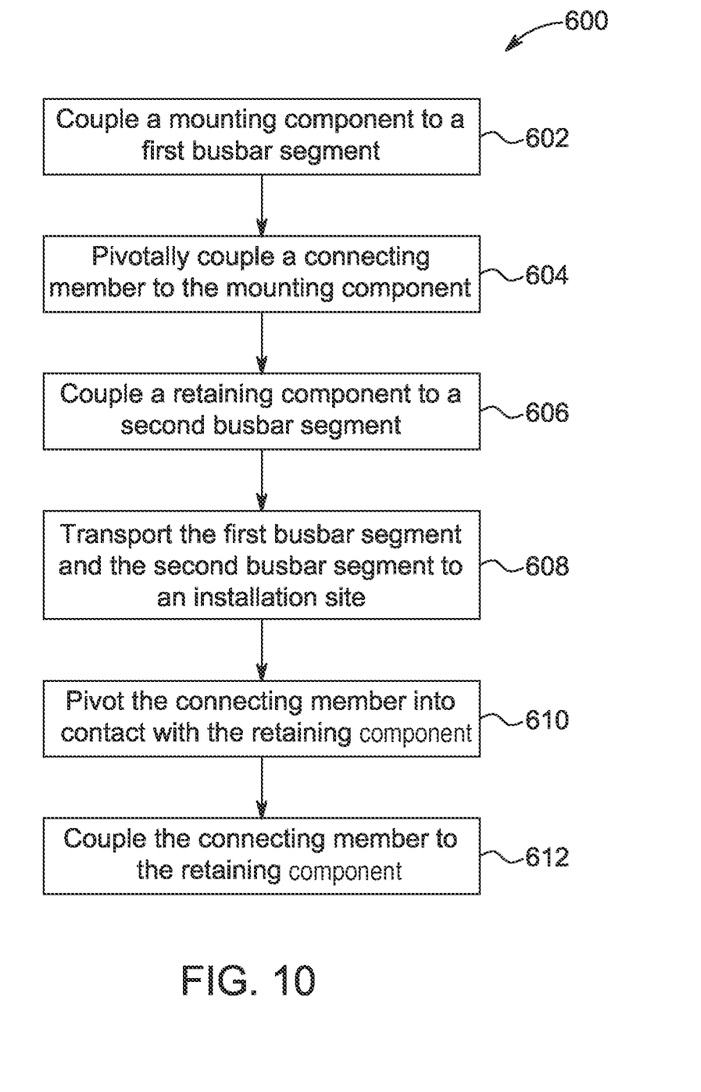
FIG. 10 is a flow diagram of an exemplary method of transporting switchgear components that may be used with busbar connection system shown in FIG. 2.

FIG. 10 is a flow diagram of an exemplary method 600 of transporting switchgear components that may be used with switchgear unit 102 (shown in FIG. 1) and/or power distribution system 100 (shown in FIG. 1).

Method 600 includes coupling 602 a mounting component, such as mounting component 322 (shown in FIG. 3), to a first, or input, busbar segment, such as first busbar segment 308 (shown in FIG. 3). The mounting component includes a slot 426 defined in an end of the mounting component. A connecting member, such as connecting member 324 (shown in FIG. 3), is pivotally and/or slidably coupled 604 to the mounting component. More specifically, a first opening, or slot, of the connecting member is aligned with the slot of the mounting component, and a coupling mechanism, such as pivot member 362 (shown in FIG. 3), is inserted through the connecting member slot and through the mounting component slot to couple 604 the connecting member to the mounting component. The connecting member slot includes a first end and a second end, and the mounting component slot includes a first end and a second end. The coupling mechanism is positioned against, or proximate to, the second end of the connecting member slot, and is positioned against, or proximate to, the second end of the mounting component slot.

A retaining component, such as retaining component 326 is coupled 606 to a second, or output, busbar segment, such as third busbar segment 312 (both shown in FIG. 3). The retaining component is configured to be coupled to the connecting member during installation, for example. The switchgear, including the first busbar with the connecting member and the mounting component coupled thereto, and the second busbar with the retaining component coupled thereto, are transported 608 to an installation site, such as a power plant, an office building, a manufacturing facility, and/or any other site at which the switchgear are to be installed.

The switchgear is installed and/or assembled at the installation site. Specifically, the connecting member is pivoted 610 into contact with the retaining component, or into position with respect to the retaining component. As the connecting member is pivoted 610, the connecting member is extended towards the output busbar segment and the retaining component. The connecting member moves along the mounting component slot such that the coupling mechanism is positioned against, or proximate to, the first end of the connecting member slot and is positioned against, or proximate to, the first end of the mounting component slot.

The connecting member is coupled 612 to the retaining component, for example, by inserting another coupling mechanism, such as sixth coupling mechanism 368 (shown in FIG. 3) into the second opening of the connecting member and into the retaining component. As such, the first busbar segment is coupled to the second busbar segment to enable current to be transmitted through the first and second busbar segments.

Method 600 may be expanded and/or repeated for other busbar segments 206 and/or connecting members 324 of busbar connection system 204 as desired. It should be noted that unless otherwise specified, the order of the steps of method 600 may be interchanged as desired. For example, the retaining component may be coupled 606 to the second busbar segment after the first busbar segment and/or the second busbar segment has been transported 608 to the installation site.

Exemplary embodiments of a busbar connection system, a switchgear unit, and a method of transporting switchgear components are described above in detail. The busbar connection system, the switchgear unit, and the method are not limited to the specific embodiments described herein but, rather, components of the busbar connection system and/or the switchgear unit and/or steps of the method may be utilized independently and separately from other components and/or steps described herein. Further, the described operations and/or components may also be defined in, or used in combination with, other systems, methods, and/or devices, and are not limited to practice with only the circuit protection device or the power distribution system as described herein.

Although the present invention is described in connection with an exemplary switchgear unit, embodiments of the invention are operational with numerous other circuit protection devices, or other systems or devices. The switchgear unit described herein is not intended to suggest any limitation as to the scope of use or functionality of any aspect of the invention. In addition, the switchgear unit described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A busbar connection system for coupling a first busbar segment to a second busbar segment, said busbar connection system comprising:
   a mounting component defining a slot, said mounting component configured to be coupled to the first busbar segment;
   a retaining component configured to be coupled to the second busbar segment;
   a connecting member comprising a first end and an opposing second end, wherein said first end is configured to be coupled to said mounting component and said second end is configured to be coupled to said retaining component; and
   a pivot member configured to be coupled to said first end and shaped to be operatively received within the slot, wherein said pivot member enables said connecting member to pivot about said mounting component.

2. A busbar connection system in accordance with claim 1, wherein said connecting member is configured to be slidably coupled to said mounting component by said pivot member.

3. A busbar connection system in accordance with claim 1, wherein a first opening is defined within said retaining component and a second opening is defined within said second end, said connecting member is configured to be coupled to said retaining component when the second opening is aligned with the first opening.

4. A busbar connection system in accordance with claim 3, further comprising a coupling mechanism configured to be inserted through the second opening and through the first opening to couple said connecting member to said retaining component.

5. A busbar connection system in accordance with claim 4, further comprising an internally threaded self-clinching fastener coupled within the first opening, said coupling mechanism configured to be inserted through said fastener.

6. A busbar connection system in accordance with claim 3, wherein said first end defines a third opening, said pivot member is configured to be operatively slidable within the slot and within the third opening.

7. A switchgear unit comprising:
   first busbar segment;
   a second busbar segment;
   a trip mechanism coupled to at least one of said first busbar segment and said second busbar segment; and
   a busbar connection system comprising:
      a mounting component defining a slot, said mounting component configured to be coupled to said first busbar segment;
      a retaining component configured to be coupled to said second busbar segment;
      a connecting member comprising a first end and an opposing second end, wherein said first end is configured to be coupled to said mounting component and said second end is configured to be coupled to said retaining component; and
      a pivot member configured to be coupled to said first end and shaped to be operatively received within the slot, wherein said pivot member enables said connecting member to pivot about said mounting component.

8. A switchgear unit in accordance with claim 7, wherein said connecting member is configured to be slidably coupled to said mounting component by said pivot member.

9. A switchgear unit in accordance with claim 7, wherein a first opening is defined within said retaining component and a second opening is defined within said second end, said connecting member is configured to be coupled to said retaining component when the second opening is aligned with the first opening.

10. A switchgear unit in accordance with claim 9, further comprising a coupling mechanism configured to be inserted through the second opening and through the first opening to couple said connecting member to said retaining component.

11. A switchgear unit in accordance with claim 10, further comprising an internally threaded self-clinching fastener coupled within the first opening, said coupling mechanism configured to be inserted through said fastener.

12. A switchgear unit in accordance with claim 9, wherein said first end defines a third opening, said pivot member is configured to be operatively slidable within the slot and within the third opening.

13. A switchgear unit in accordance with claim 7, further comprising a third busbar segment spaced apart from said first busbar segment such that a gap is defined between said first busbar segment and said third busbar segment.

14. A switchgear unit in accordance with claim 13, wherein said pivot member is inserted through the gap when said connecting member is coupled to said mounting component.

15. A method of transporting switchgear components including a first busbar segment and a second busbar segment, said method comprising:
 coupling a mounting component to the first busbar segment, wherein a slot is defined within the mounting component;
 pivotally coupling a connecting member to the mounting component by inserting a pivot member through the slot, wherein the pivot member is one of coupled to the connecting member and formed within the connecting member;
 coupling a retaining component to the second busbar segment, wherein the retaining component is configured to be coupled to the connecting member; and
 transporting the first busbar segment and the second busbar segment to a predetermined location.

16. A method in accordance with claim 15, further comprising slidably coupling the connecting member to the first busbar segment such that the connecting member is slidable and pivotal with respect to the first busbar segment.

17. A method in accordance with claim 15, further comprising coupling the connecting member to the retaining component at the predetermined location.

18. A method in accordance with claim 17, wherein a first opening is defined within the connecting member and a second opening is defined within the retaining component, said coupling the connecting member to the retaining component comprises aligning the first opening with the second opening.

19. A method in accordance with claim 18, wherein said coupling the connecting member to the retaining component further comprises inserting the pivot member through the first opening and the second opening.

20. A method in accordance with claim 15, wherein an opening is defined within the retaining component, said method further comprising coupling an internally threaded self-clinching fastener within the opening to facilitate coupling the connecting member to the retaining component.

* * * * *